United States Patent
Busse et al.

(10) Patent No.: US 6,931,461 B2
(45) Date of Patent: Aug. 16, 2005

(54) BUS OPTIMIZATION BASED ON NETWORK DEVICE COMMUNICATION

(75) Inventors: Frederick L. Busse, Aloha, OR (US); Wey-Yi W. Guy, Beaverton, OR (US); Thomas A. Schultz, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 20 days.

(21) Appl. No.: 10/172,170

(22) Filed: Jun. 14, 2002

(65) Prior Publication Data

US 2003/0233500 A1 Dec. 18, 2003

(51) Int. Cl.[7] .............................................. G06F 3/00
(52) U.S. Cl. ..................... 710/60; 710/63; 710/105; 709/232; 709/233
(58) Field of Search ........................... 710/60, 63, 105; 709/232, 233

(56) References Cited

U.S. PATENT DOCUMENTS

| | | | | |
|---|---|---|---|---|
| 5,910,970 A | * | 6/1999 | Lu .............................. | 375/377 |
| 6,067,408 A | * | 5/2000 | Runaldue et al. ........... | 710/307 |
| 6,092,210 A | * | 7/2000 | Larky et al. ................. | 713/400 |
| 6,185,641 B1 | * | 2/2001 | Dunnihoo .................... | 710/56 |
| 6,408,351 B1 | * | 6/2002 | Hamdi et al. ................ | 710/63 |
| 6,424,636 B1 | * | 7/2002 | Seazholtz et al. ........... | 370/295 |
| 6,477,595 B1 | * | 11/2002 | Cohen et al. ............... | 710/105 |
| 6,678,760 B2 | * | 1/2004 | Brief ........................... | 710/52 |

* cited by examiner

Primary Examiner—Jeffrey Gaffin
Assistant Examiner—Niketa Patel
(74) Attorney, Agent, or Firm—Molly A. McCall

(57) ABSTRACT

Embodiments of a method and apparatus for improving bus utilization, such as for transferring data to a modem, for example, are described.

21 Claims, 2 Drawing Sheets

BUS OPTIMIZATION BASED ON NETWORK DEVICE COMMUNICATION

BACKGROUND

This disclosure is related to a method and/or apparatus for improving bus utilization where a modem, such as a digital subscriber line (DSL) modem, is employed.

Devices that handle, store, display, route and/or process information, such as computers or other computing devices, for example, may transmit and/or receive data or other information in a packet format, such as between itself and other computing devices or computing platforms, over or via a network, such as a telecommunications network. A computing device or other computing platform may include a processor and memory. Such a device may in at least some cases be coupled via a local bus to a modem.

A modem may comprise any device that modulates and/or demodulates data, examples of which include, but are not limited to, an analog modem, a cable modem, or a digital subscriber line (DSL) modem. Modems may be used to process data and/or other types of information transmitted and/or received via a network. Likewise, one example of a local bus or communications link may include a high-speed connection, such as a local bus or communications link that complies with the Universal Serial Bus (USB) Specification, version 1.1, published September 1998, hereinafter referred to as a USB compliant bus, USB compliant local bus, or simply a universal serial bus or USB.

A computing device or platform, such as previously described, if coupled to a network, such as via a modem, for example, may comprise a node on the network. Such a network may include a plurality of interconnected nodes, and, therefore, may comprise, for example, without limitation, nodes other than the previously mentioned computing device that may comprise, for example, personal data assistants (PDAs), set tops boxes, peripherals, servers and/or terminals.

A computing device or platform, such as a computer, for example, may typically include an operating system. Furthermore, code may be present, such as on the computing device, on the platform, or on the modem, that initializes the modem. Such code may also provide the ability to transfer data from the computing device or platform to another node on the network via the modem. In the case of a DSL network, the rate the modem transmits and/or receives data, e.g., the transmission rate and/or the reception rate, sometimes referred to as the data rate, may be set, at least in part, by a DSL central office (CO). The DSL CO is typically coupled to the modem via the network. The CO will typically transmit a training signal to the DSL modem. The modem will typically process the training signal to then establish a data rate for the modem.

The rate at which a computing platform may transfer data to another device, such as a peripheral, for example, coupled to the platform via a USB compliant local bus may be set, at least in part, based on initialization of the modem. During such modem initialization, the computing platform may allocate or open a channel or pipe via the USB compliant bus to the peripheral, for example, or to another USB compliant device, and transfer data over the channel using a communication method such as, for example, described in the aforementioned USB specification. A channel is defined in the USB specification as the number of packets being transferred per millisecond between the computing device or platform and a USB compliant device. In circumstances where a DSL modem operates as a USB compliant device or USB device, the computing device or platform may employ one of at least two communications techniques to execute data transfers to the DSL modem at 8 Mbs or higher. One such USB communications technique is known as "Bulk USB" and the other technique is known as isochronous (ISO) USB. The maximum data transfer rate with these techniques is limited by the theoretical maximum bandwidth of the USB compliant bus and the implementation specific details associated with the aforementioned operating system and modem driver software. According to USB specification version 1.1, the maximum data transfer rate of a single channel or pipe is approximately 10 Mbits/sec.

For Bulk USB, a USB channel is not pre-allocated to any particular USB device and may be shared equally among the available or coupled USB devices. However, the maximum data throughput rate of devices using Bulk USB may be dependent, at least in part, on the ability of the operating system to respond in real time to the particular USB devices. Thus, the data rate between the platform and the DSL modem may be limited when many USB devices are coupled to the platform.

With ISO USB, the USB bandwidth may be pre-allocated to a coupled USB device by the computing platform upon initialization of the modem. However, bandwidth pre-allocation may present problems if other USB devices are also coupled via the USB compliant bus. Specifically, DSL modems may transfer data at a high data rate and may employ a high bandwidth. Thus, the modem may utilize a large percentage of the total bandwidth available. If USB devices are coupled to the USB compliant when it is oversubscribed (e.g. the USB devices coupled to the USB compliant bus exceed the available bandwidth), the platform may not allow these other devices to be installed on the bus. Likewise, it may also detrimentally impact the performance of a USB device coupled to the bus that employs Bulk USB, e.g., a Bulk USB device, if a high bandwidth ISO USB device is also coupled to the bus.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and appendages thereof, may best be understood by reference of the following detailed description when read with the accompanying drawing in which:

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail in order so as not to obscure the claimed subject matter.

Figure 1:
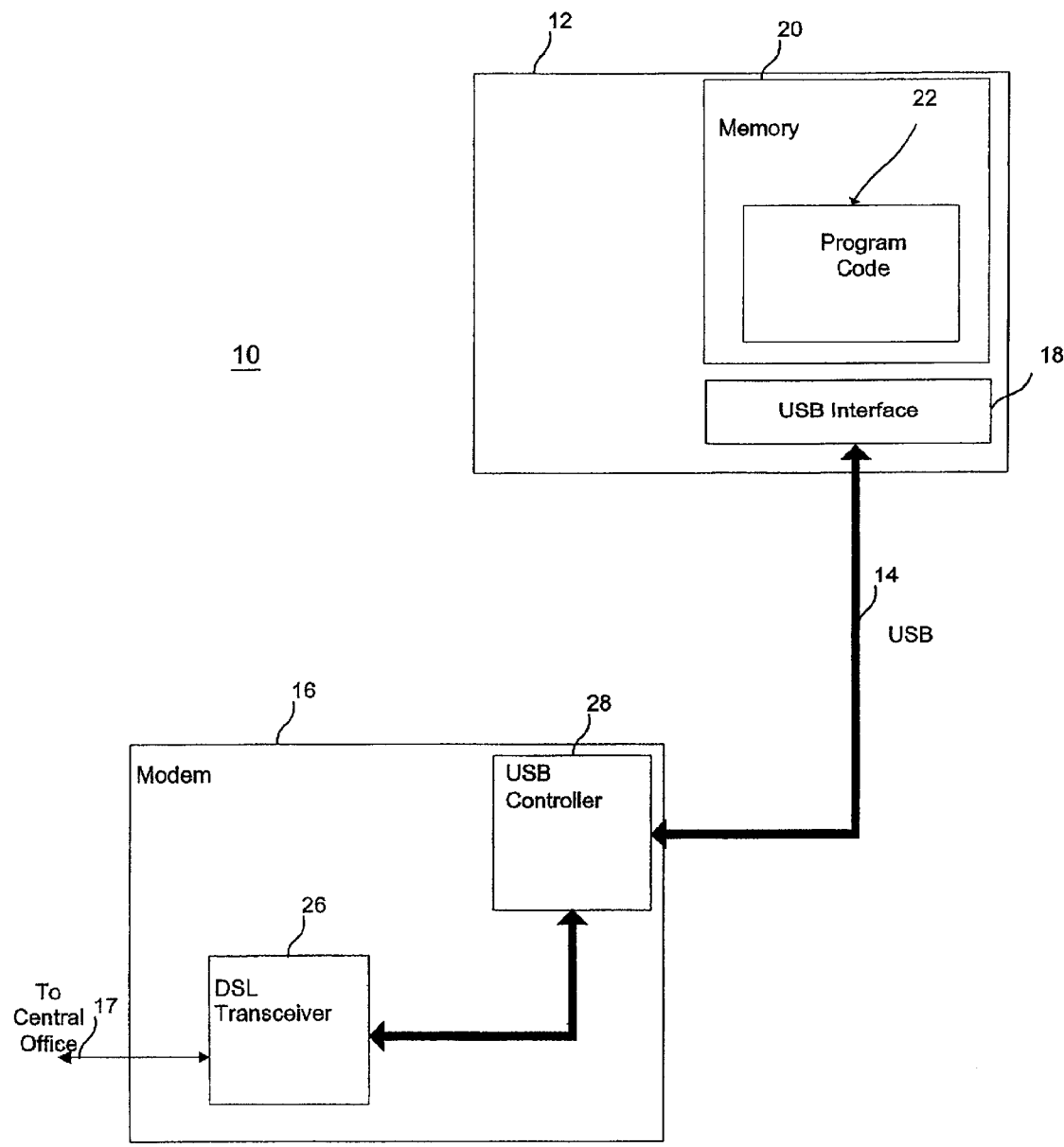
FIG. 1 is a block diagram illustrating one embodiment of a system in accordance with the claimed subject matter.

Although the claimed subject matter is not limited in scope in this respect, FIG. 1 illustrates an embodiment 10 of a system. System 10 includes a computing device or platform 12 coupled via a USB compliant bus 14 to a modem 16.

Computing platform 12 may comprise, without limitation, any device, machine, computer or other computing device that handles, stores, displays, routes, and/or processes information and/or data. Modem 16 may be coupled via network media 17 to a DSL access multiplexer (DSLAM) in a central office (not shown), although, the claimed subject matter is not limited in scope in this respect. Network media 17, the medium employed for transferring the data, comprises, but is not limited to, optical fiber cables, coaxial cables, and/or twisted pair copper wires. Of course, the data may also be transferred using a wireless medium as well, such as radio waves, for example. Although the claimed subject matter is not limited in scope in this respect, for the purposes of this embodiment, it will be assumed modem 16 may comprise any type of modem, such as an analog modem, a digital modem, a cable modem or a DSL modem, for example.

Computing platform 12 may include a USB compliant interface or USB interface 18 and memory 20. Memory 20 may comprise data, such as to be transferred, as well as program code 22. USB interface 18 may include code and hardware that provide the capability to couple program code 22 with USB 14. Examples of such program code 22 may include an operating system, driver code, and/or DSL transceiver code. Platform 12 in this embodiment executes program code 22 having instructions stored in memory 20 that produce the functionality described hereinafter. Although a USB compliant bus 14 here couples platform 12 to modem 16, it is understood that this bus may comprise any bus having a data rate allocated specifically to modem 16.

Although the claimed subject matter is not limited in scope in this respect, modem 16 may comprise transceiver 26, such as, for example, a DSL transceiver, coupled to USB controller 28. Transceiver 26 here includes any device for transmitting and receiving signals via a network media, communications line or a communications network. One example, without limitation, of course, of such a transceiver includes part number GS7070 manufactured by Globespan Virata (formerly Globespan Inc.) of Red Bank, N.J. Controller 28 may include a computational device such as, but not limited to, a state machine, a digital signal processor, an arithmetic logic unit (ALU) or a processor that conducts arithmetic and/or logical computations. An example of controller 28, again without limitation, may include part number AN2131 QC manufactured by Cypress Semiconductor of San Jose, Calif.

Although shown in FIG. 1 separate from platform 12, for example, modem 16 may instead be contained within platform 12 and coupled to a bus within the platform. Likewise, modem 16 may comprise a single integrated circuit (IC), multiple ICs or may be integrated into circuitry within platform 12. Modem 16 transfers data in packet form to and from network media 17 in this particular embodiment.

Figure 2:
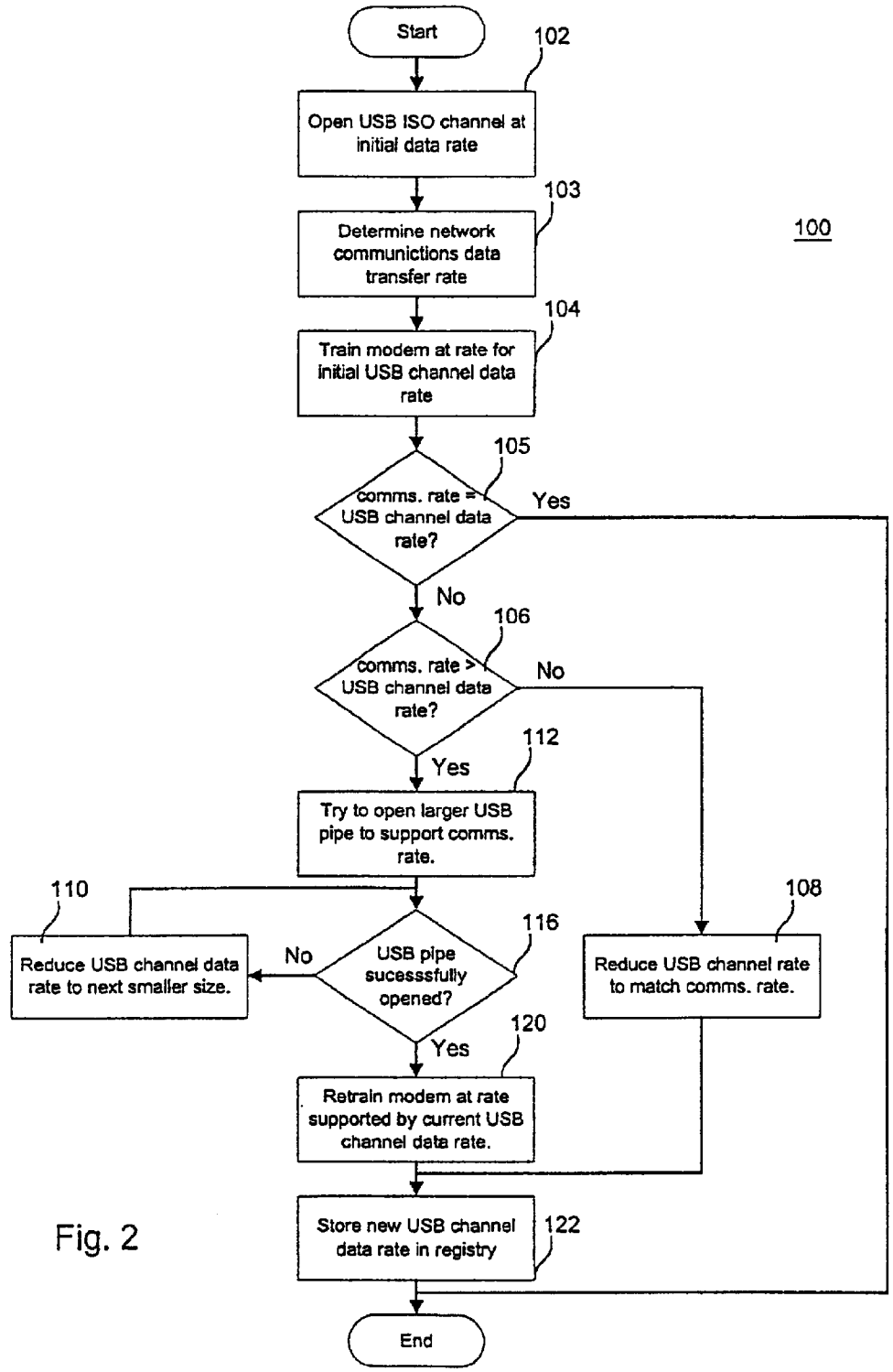
FIG. 2 is a flow diagram illustrating one embodiment of a method in accordance with the claimed subject matter.

Although the claimed subject matter is not limited in scope in this respect, FIG. 2 illustrates one embodiment of a method 100 for improving bus utilization. Platform 12 by executing program code 22, such as may be included in an operating system, for example, may initiate the execution of method 100 by a program call, although, again, the claimed subject matter is not limited in scope in this respect.

In block 102, a platform, such as 12, executing program code, such as, but not limited to, driver code, such as 22, for example, may open a USB isochronous (ISO) channel to modem, such as 16, for example. Such a USB ISO channel may be open, for example, with an initial USB data rate allocated to modem 16. On an initial execution of die program code, for example, the initial data rate may be set to a specified maximum ISO data rate available for a USB channel. This initial ISO data rate will herein be referred to as the "initial data rate". In one embodiment, although the claimed subject matter is not limited in scope in this respect, a registry table may be provided in memory, such as on the platform, listing the possible data rates for different DSLAM implementations along with corresponding USB setting for these DSLAM implementations. The initials data rate may be taken from this table in this particular embodiment, although, the claimed subject matter is not limited in scope in this respect. In block 104, the platform may train the communications data rate of the modem at the initial rate.

Here, although again, the claimed subject matter is not limited in scope in this respect, this table may include an upper and a lower limit of trained rates capable of being supported. The table may be configured to take into account various properties, including the DSLAM employed, such as vendor, model, etc., and the mode of the DSL connection, such as fast or interleaved, for example. Thus, in this particular embodiment, the platform is able to select a value from the table corresponding to, for example, a vendor of the DSLAM, a framing mode of the modem, etc.

In addition to obtaining a rate from a table, the platform may also attempt to determine an appropriate or feasible rate based on measurements. Although the claimed subject matter is not limited in scope in this respect, in block 103, a platform, such as 12, may determine a modem rate by sending a signal to the central office via USB 14 and modem 16. Typically, this may be accomplished by modem 16 sending a signal to the central office via network 17 requesting establishment of a connection. Here, of course, the term "connection" refers to mutually operational communication between the central office and the platform, in this embodiment. In response thereto, the central office may send a training signal to modem 16. Modem 16 and the central office may detect each other's signals and exchange operational information. Modem 16 may use this operational information and the training signal to determine a rate at which modem 16 may transmit and receive data via network 17. Typically, it is desirable that the rate be as high as potentially feasible. This rate is referred to herein as the "network communications data transfer rate", or "communications data rate." It is noted that although block 103 is illustrated in FIG. 2 between blocks 102 and 104, it is not necessary that these blocks necessarily occur in this particular order to be within the scope of the claimed subject matter.

In block 105, the platform detects whether the communications data rate is equal to the initial data rate of the USB ISO channel. If the communications data rate is equal to the initial data rate of the USB ISO channel, the data rate of the USB ISO channel and current modem rate is not changed, and method 100 ends, in this particular embodiment. Of course, alternative embodiments may then go on to provide additional or alternative features.

Likewise, if the communications rate is not equal to the initial data rate of the USB ISO channel, in block 106, a determination may be made whether the communications rate exceeds the bandwidth of the USB ISO channel, here the data rate of the available USB. The data rate of the available USB is the maximum rate that data can be transferred over the USB between the platform and the modem, for this embodiment. If the communications data rate is not greater than the data rate of the USB ISO channel, a platform, such as 12, may then automatically reduce the initial data rate, if appropriate, so that the bandwidth of the opened USB ISO channel does not exceed the limitation of available USB bandwidth (inclusive of bandwidth allocated to other peripherals on the USB). In block 108, for example, the data rate of the USB channel may be reduced to match the communications data rate in order to conserve bandwidth.

If the communications rate is greater than the available USB rate, in block 112, platform 12 may attempt to open the largest USB channel possible for this embodiment to support the communications data rate so as to reduce the impact on performance to the extent possible. It is noted, however, for a variety of reasons, such as bandwidth considerations, rather than open the largest USB channel, instead, a larger USB channel may be open that is less than the largest USB channel, and then, depending on the embodiment and situation, potentially adjusted further. For example, the current data rate of the USB channel for modem 16 may be set to a larger isochronous data rate subject to the limitation of available USB bandwidth (inclusive of bandwidth allocated to other peripherals on the USB). As previously indicated, for this embodiment, isochronous data rates may be selected from a table stored in memory. This table may list possible USB isochronous data rates corresponding to the vendor of the DSLAM communicating with the modem, a framing mode of the modem, etc., as previously described; the platform may not successfully open the largest or maximum USB channel based on the rate from the table, for this particular embodiment, that is.

In block 116, platform 12 executing program code, such as 22, for example, may determine if the USB ISO channel has been opened to support communications data rate. If the USB ISO channel has not been opened to support the communications data rate, in block 110, the current data rate of the USB ISO channel may be reduced to a smaller USB channel, such as the next smaller USB isochronous data rate available as supported by modem 16, in the particular embodiment. If the USB ISO channel is successfully opened, in block 120, platform 12 may provide an indication signal to the modem 16 via USB 14 to change (e.g. retrain) the data rate that modem 16 transfers data via the network 17. In block 122, platform 12 stores the data rate of the current USB ISO channel.

It will, of course, be understood that, although particular embodiments have just been described, the claimed subject matter is not limited in scope to a particular embodiment or implementation. For example, one embodiment may be in hardware, whereas another embodiment may be in software. Likewise, an embodiment may be in firmware, or any combination of hardware, software, or firmware, for example. Furthermore, although the claimed subject matter is not limited in scope in this respect, one embodiment may comprise an article, such as a storage medium. Such a storage medium, such as, for example, a CD-ROM, or a disk, may have stored thereon instructions, which when executed by a system, such as a computer system or platform, or an imaging system, for example, may result in an embodiment of a method in accordance with the claimed subject matter being executed, such as an embodiment of a method of improved bus utilization, for example, as previously described.

While certain features of the claimed subject matter have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. A network communications device, comprising:
   a modem; and
   a computing platform, said computing platform coupled to the modem via a bus, said network communications device being operative to transfer data from the platform to the modem via the bus at an initial data rate and being operative to adjust the data rate of the bus based at least in part upon a network communications data transfer rate between the modem and a network.

2. The network communications device of claim 1, wherein the data rate of the bus comprises an isochronous data rate.

3. The network communications device of claim 1, wherein the connection between the modem and the network comprises a digital subscriber line (DSL) connection.

4. The network communications device of claim 1, wherein the bus comprises a universal serial bus (USB).

5. The network communications device of claim 1, wherein the network communications device being operative to set the initial data rate of the bus at a rate greater than the network communications data transfer rate.

6. The network communications device of claim 1, wherein the network communications device being operative to set the initial data rate of the bus at a rate less than the network communications data transfer rate.

7. The network communications device of claim 1, wherein the network communications device is operative to set the data rate of the bus to an initial value and is operative to reduce the data rate of the bus if the network communications data transfer rate is less than the initial value of the data rate of the bus.

8. The network communications device of claim 1, wherein the network communications device is operative to set the data rate of the bus to an initial data rate and is operative to raise the data rate of the bus if the network communications data transfer rate is greater than the initial value of the data rate of the bus.

9. A method comprising:
   transferring data to a modem via the bus at a data transfer rate;
   measuring a network communications transfer data rate between the modem and a network; and
   adjusting the data transfer rate of the bus based at least in part on the measured network communications data transfer rate.

10. The method of claim 9, wherein transferring data to the modem via the bus comprises transferring data at an initial data transfer rate.

11. The method of claim 9, wherein the data rate of the bus comprises an isochronous data rate.

12. The method of claim 9, wherein the bus comprises a universal serial bus.

13. The method of claim 9, wherein the connection between the modem and the network comprises a digital subscriber line (DSL) connection.

14. The method of claim 9, wherein adjusting the data transfer rate of the bus based at least in part on the measured network communications data transfer rate comprises reducing the data rate of the bus if the measured network communications data transfer rate is less than the data transfer rate of the bus.

15. The method of claim 9, wherein adjusting the data transfer rate of the bus based at least in part on the measured network communications data transfer rate comprises increasing the data rate of the bus if the measured network communications data transfer rate is more than the data transfer rate of the bus.

16. An article comprising:
a storage medium, having stored thereon instructions that, when executed, result in improved utilization of a bus for transferring data to a modem by:
transferring data to the modem via the bus at a data transfer rate;
measuring a network communications transfer data rate between the modem and a network; and
adjusting the data transfer rate of the bus based at least in part on the measured network communications data transfer rate.

17. The article of claim 16, wherein said instructions, when executed, result in transferring data to the modem via the bus at an initial data transfer rate.

18. The article of claim 16, wherein said instructions, when executed, result in the data rate of the bus comprising an isochronous data rate.

19. The article of claim 16, wherein said instructions, when executed, result in the bus comprising a universal serial bus.

20. The article of claim 16, wherein said instructions, when executed, result in adjusting the data transfer rate of the bus based at least in part on the measured network communications data transfer rate by reducing the data rate of the bus if the measured network communications data transfer rate is less than the data transfer rate of the bus.

21. The article of claim 16, wherein said instructions, when executed, result in adjusting the data transfer rate of the bus based at least in part on the measured network communications data transfer rate by increasing the data rate of the bus if the measured network communications data transfer rate is more than the data transfer rate of the bus.

* * * * *

UNITED STATES PATENT AND TRADEMARK OFFICE
CERTIFICATE OF CORRECTION

PATENT NO. : 6,931,461 B2
DATED : August 16, 2005
INVENTOR(S) : Busse et al.

It is certified that error appears in the above-identified patent and that said Letters Patent is hereby corrected as shown below:

Column 3,
Line 66, delete "die" and insert -- the --.

Column 7,
Line 13, delete "modern" and insert -- modem --.

Signed and Sealed this

Eighteenth Day of October, 2005

JON W. DUDAS
*Director of the United States Patent and Trademark Office*